(12) United States Patent
Schmidt et al.

(10) Patent No.: US 9,540,097 B2
(45) Date of Patent: Jan. 10, 2017

(54) MULTIFUNCTION DEVICE FOR AN UNDERCARRIAGE

(71) Applicant: MESSIER-BUGATTI-DOWTY, Velizy-Villacoublay (FR)

(72) Inventors: Robert Kyle Schmidt, Velizy-Villacoublay (FR); Jean-Luc Alleau, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 194 days.

(21) Appl. No.: 14/200,277

(22) Filed: Mar. 7, 2014

(65) Prior Publication Data
US 2014/0263832 A1 Sep. 18, 2014

(30) Foreign Application Priority Data

Mar. 12, 2013 (FR) ..................... 13 52210

(51) Int. Cl.
*B64C 25/24* (2006.01)
*B64C 25/40* (2006.01)
*B64C 25/12* (2006.01)

(52) U.S. Cl.
CPC ............. *B64C 25/405* (2013.01); *B64C 25/12* (2013.01); *B64C 25/24* (2013.01); *Y02T 50/823* (2013.01)

(58) Field of Classification Search
CPC ......... B64C 25/405; B64C 25/12; B64C 25/24
See application file for complete search history.

(56) References Cited

U.S. PATENT DOCUMENTS

| 2,460,387 | A | * | 2/1949 | Hunter | ............... | B64C 25/405 244/103 R |
| 3,814,354 | A | * | 6/1974 | Reese | ............... | B64C 25/405 244/103 S |
| 8,740,140 | B2 | * | 6/2014 | Alleau | ............... | B64C 25/24 244/102 R |
| 2011/0233328 | A1 | | 9/2011 | Alleau et al. | | |

FOREIGN PATENT DOCUMENTS

| AU | 533 156 B2 | 11/1983 |
| DE | 20 2008 002 977 U1 | 11/2008 |
| FR | 2 939 099 A1 | 6/2010 |

OTHER PUBLICATIONS

Crocker, David [editor]. Dictionary of Aviation, 2nd ed. A&C Black Publishers Ltd., London (2007). p. 241.*
French Preliminary Search Report for FR 13 52210 dated Oct. 29, 2013.

* cited by examiner

*Primary Examiner* — Brian M O'Hara
*Assistant Examiner* — Michael Kreiner
(74) *Attorney, Agent, or Firm* — Sughrue Mion, PLLC

(57) ABSTRACT

A multifunction device for an undercarriage. The device comprises at least a first shaft rotatably mounted on the aircraft to rotate about an axis of rotation that is substantially parallel to a hinge axis hinging the undercarriage to the aircraft, and a telescopic second shaft rotatably mounted in the undercarriage and extending down along the undercarriage to the proximity of wheels carried thereby. A motor is adapted to cause the first shaft to rotate. The telescopic second shaft is a single shaft that extends inside the undercarriage to the proximity of an axle carrying the wheels of the undercarriage. The second shaft is connected to a differential connected to the wheels via drive shafts extending inside the axle.

9 Claims, 3 Drawing Sheets

MULTIFUNCTION DEVICE FOR AN UNDERCARRIAGE

The invention relates to a multifunction device for an undercarriage, suitable for driving the wheels of the undercarriage, and also for extending it and raising it.

TECHNOLOGICAL BACKGROUND OF THE INVENTION

Document U.S. Pat. No. 8,740,140, also published as US2014263832 and FR 2 939 099, is incorporated by reference. This document discloses a device comprising at least:
- a first shaft rotatably mounted on the aircraft to rotate about an axis of rotation that is substantially parallel to a hinge axis hinging the undercarriage to the aircraft;
- a telescopic second shaft rotatably mounted on the undercarriage and extending down along the undercarriage to the proximity of wheels carried thereby;
- transmission means for transmitting rotary motion from the first shaft to the second shaft;
- transmission means for transmitting rotary motion from the second shaft to at least one wheel carried by the undercarriage;
- if the wheel is not fitted with a brake, means for selectively braking one of the shafts relative to the undercarriage; and
- motor means adapted to cause the first shaft to rotate.

That type of device makes it possible not only to drive the wheels in rotation, but also to extend and to raise the undercarriage. In the embodiment shown in that document, the undercarriage is fitted with two telescopic second shafts extending on either side of the undercarriage, each co-operating with a respective one of the wheels.

The second shafts extend down of the sides of the undercarriage so they are exposed to external attacks, in particular to impacts from stones and to carbon dust projected from brake disks, which attacks run the risk of having an influence on the lifetime of the device.

OBJECT OF THE INVENTION

The invention seeks to propose a multifunction device that is less exposed to external attacks.

BRIEF SUMMARY OF THE INVENTION

In order to achieve this object, the invention proposes a multifunction device for an undercarriage, the device comprising at least:
- a first shaft rotatably mounted on the aircraft to rotate about an axis of rotation that is substantially parallel to a hinge axis hinging the undercarriage to the aircraft;
- a telescopic second shaft rotatably mounted on the undercarriage and extending down along the undercarriage to the proximity of wheels carried thereby;
- transmission means for transmitting rotary motion from the first shaft to the second shaft;
- transmission means for transmitting rotary motion from the second shaft to at least one wheel carried by the undercarriage;
- if the wheel is not fitted with a brake, means for selectively braking one of the shafts relative to the undercarriage; and
- motor means adapted to cause the first shaft to rotate.

According to the invention, the telescopic second shaft is a single shaft and it extends inside the undercarriage to the proximity of an axle carrying the wheels of the undercarriage, the transmission means for transmitting the rotary motion of the second shaft including a differential connected to the wheels via drive shafts extending inside the axle.

Thus, the second shaft and the differential are inside the undercarriage and they are therefore protected from the outside environment. The differential makes it possible to use only one second shaft for driving both wheels.

Naturally, in order to operate the undercarriage, it suffices to prevent the wheels from rotating (or to use selective brake means for braking one of the shafts relative to the undercarriage) so as to cause the undercarriage to turn about its hinge axis.

According to a particular aspect of the invention, the telescopic second shaft has a hollow top portion and a bottom portion that extends inside the top portion, co-operating therewith via fluting in order to be able to slide therein telescopically, the top portion having an outer casing that co-operates with a diaphragm of the undercarriage to define a flow section for fluid contained in the undercarriage.

Thus, advantage is taken of the presence of the second shaft inside the undercarriage to make it act as a throttle needle, it being possible for its outer casing to be of varying diameter so as to vary the flow section for fluid as a function of the extent to which the undercarriage is compressed.

BRIEF DESCRIPTION OF THE DRAWINGS

The invention can be better understood in the light of the following description of a particular embodiment of the invention, given with reference to the figures of the accompanying drawings, in which.

DETAILED DESCRIPTION OF AN EMBODIMENT OF THE INVENTION

Figure 1:
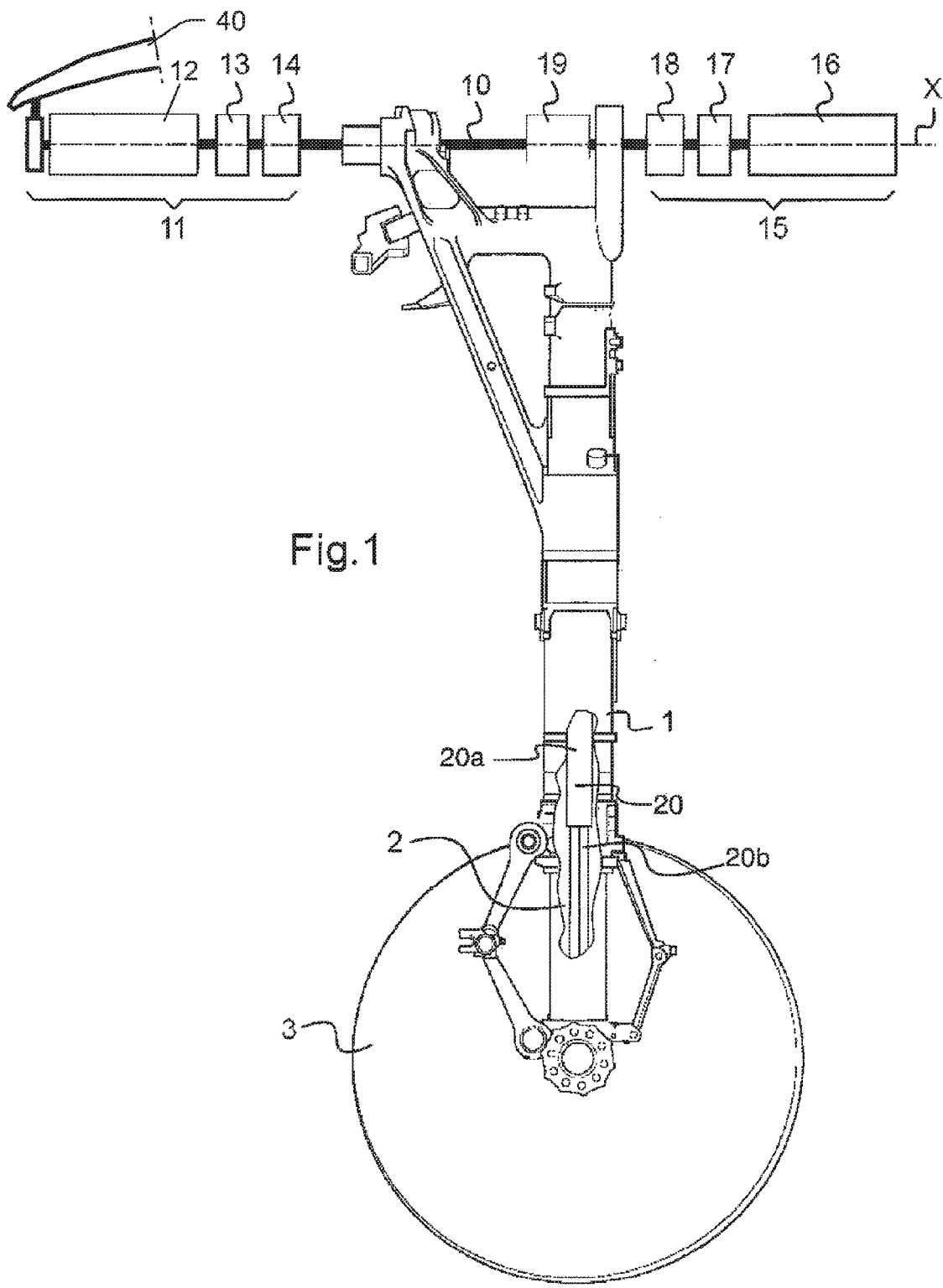
FIG. 1 is a partially cut away side view of an aircraft main undercarriage fitted with a device of the invention.
Figure 2:
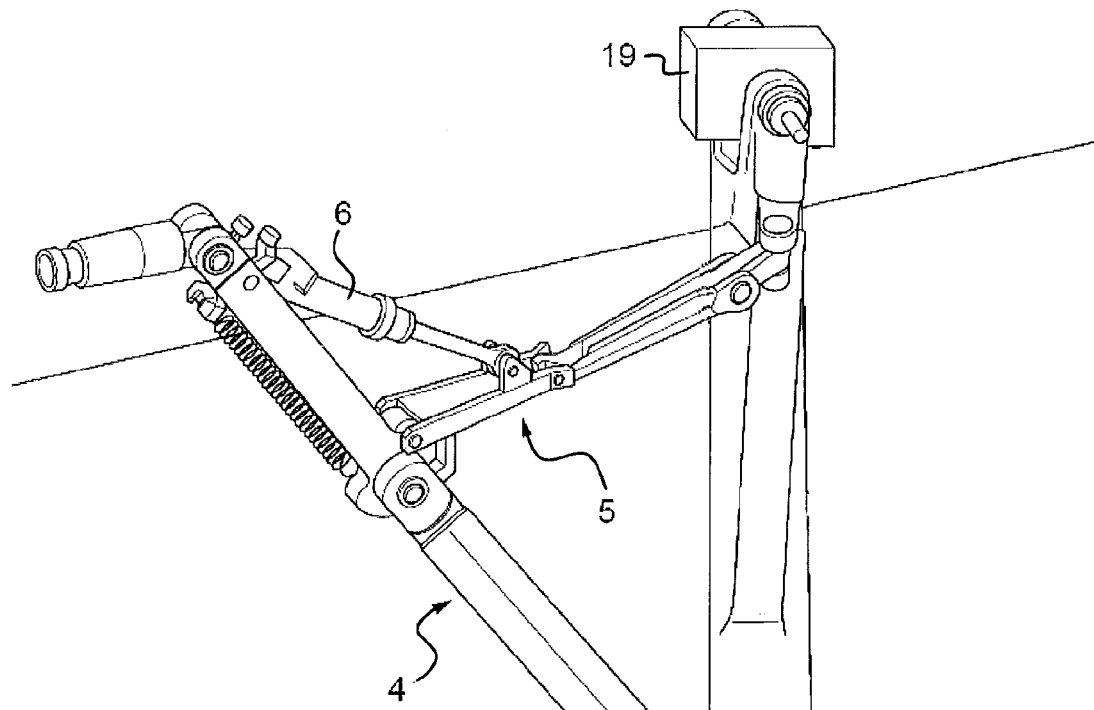
FIG. 2 is a partially cut away face view of the FIG. 1 undercarriage.
Figure 2:
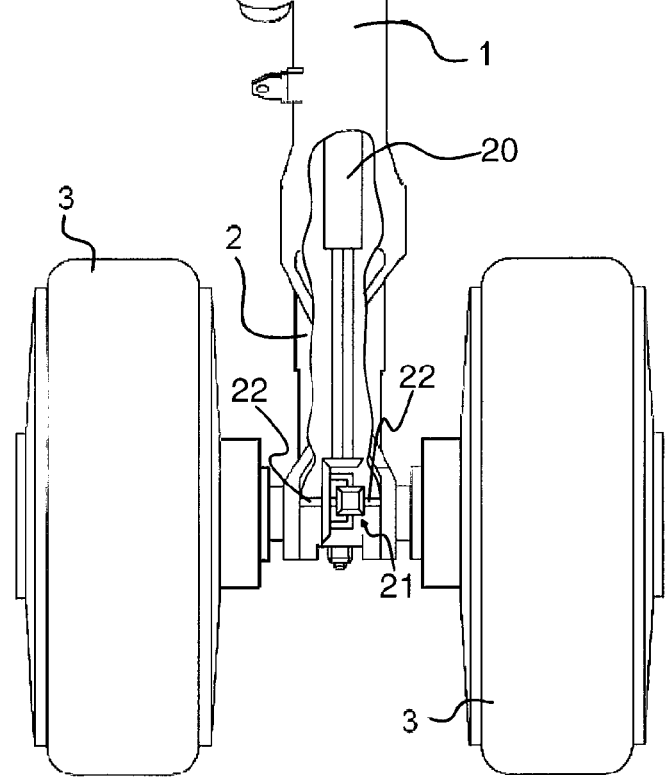

With reference to FIGS. 1 and 2, the device of the invention applies to a conventional undercarriage comprising a strut-leg 1 hinged to the structure of the aircraft about a hinge axis X, and having a slidable rod 2 mounted to slide telescopically therein. The slidable rod forms part of an internal shock absorber, and at its end it carries an axle 8 (more visible in FIG. 3) that, in this example, carries two wheels 3 (one of them being omitted from FIG. 1, for greater clarity). The undercarriage is shown in its deployed position in which it is stabilized by a foldable side-brace 4. The foldable side-brace 4 is in itself stabilized in the aligned position shown by a locking member 5 that locks automatically when the undercarriage comes close to its deployed position, and that is provided with an unlocking actuator 6 to enable the side brace to be unlocked and thus to enable the undercarriage to be raised towards its position stowed in a wheel well. This is all well known and it is recalled merely by way of information.

The multifunction device of the invention comprises firstly a first shaft 10 rotatably mounted on the structure of the aircraft to rotate about an axis of rotation R that is substantially parallel to the hinge axis X of the undercarriage. Specifically, in this example, the axes X and R coincide. However, the axis of rotation R could be distinct from the hinge axis X of the strut-leg 1. The first shaft 10 is associated with a first motor unit 11 comprising an electric motor 12 fitted with gearing 13 and with a clutch 14 enabling the first motor unit 11 to be connected to or separated from the first shaft 10. The first shaft 10 is associated with a second motor unit 15 comprising an electric motor 16 fitted with gearing 17 and with a clutch 18 enabling the second motor unit 15 to be connected to or separated from the first shaft 10.

The first shaft 10 is associated with an angle transmission gearbox 19 to constrain the first shaft 10 to rotate with a telescopic second shaft 20 that extends, in accordance with the invention, inside the undercarriage from said angle transmission 19 to a differential 21 that is arranged, in this example, in the slidable rod 2 and situated close to the wheels 3, and that links the telescopic second shaft 20 in rotation with the wheels 3. To this end, drive shafts 22 extend from the differential 21, each driving one of the wheels 3.

Naturally, the second shaft 20 is telescopic in order to accommodate the variations in the length of the undercarriage resulting from the aircraft pressing against the ground via the undercarriages, thereby tending to compress the shock absorber and thus to cause the slidable rod 2 to penetrate into the strut-leg 1. To this end, the second shaft has a hollow top portion 20a driven by the angle transmission 19, and a bottom portion 20b that is mounted via fluting to slide telescopically inside the top portion 20a. Both motor units 11, 15 may be used together when a large amount of power is needed, or they may be used sequentially, e.g. in alternation, so as to obtain substantially equal wear in each motor unit.

Figure 3:
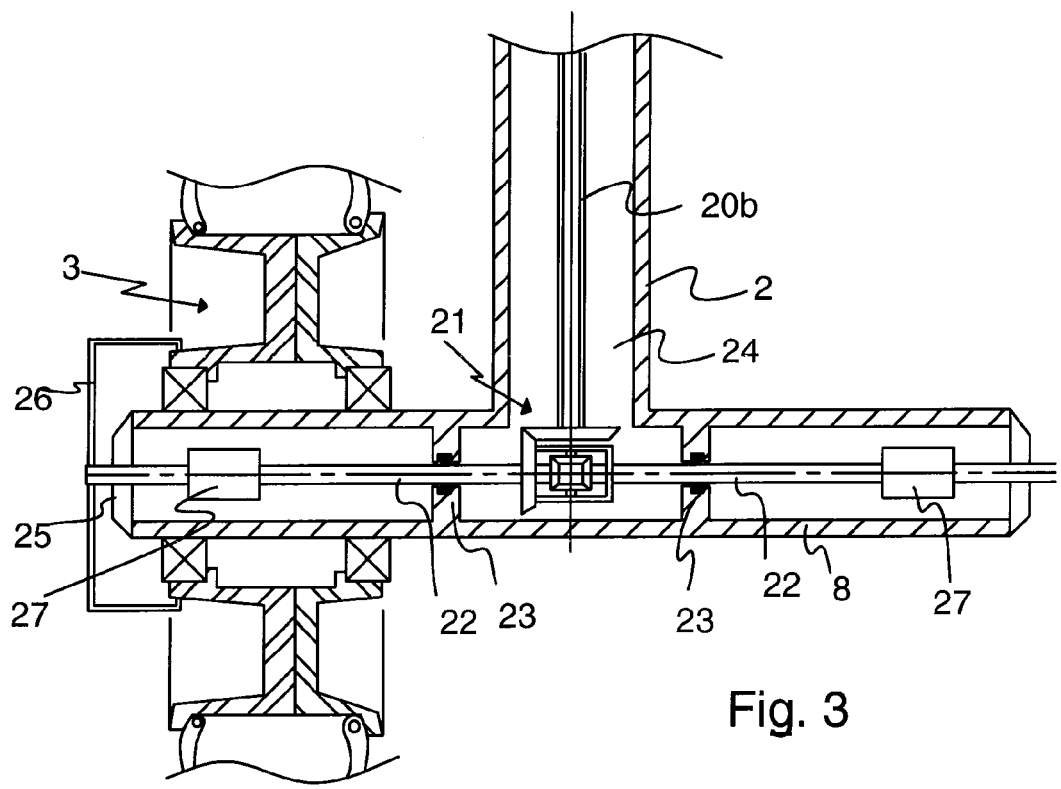
FIG. 3 is a section view of the bottom portion of the FIG. 1 undercarriage, with only one wheel being shown.

As can be seen in FIG. 3, the drive shafts extend through walls 23 that are provided with sealing gaskets so as to define a cavity 24 inside the rod 2, which cavity is filled with the oil of the shock absorber, and contains the differential 21. Each shaft 22 extends through a protective plug 25 in order to drive a cap 26, which in turn is connected to the rim of the adjacent wheel 3 in order to enable it to be driven in rotation by the second shaft 20.

The device as described serves to perform several functions. Thus, immediately before landing, while the undercarriage is in the deployed position, it is possible by using one of the motor units (a small amount of power is sufficient) to cause the wheels 3 associated with the device of the invention to rotate in flight. Rotating the wheels contributes, on landing, to reducing the forces required for setting the wheels into rotation, thereby reducing the resilient reaction to which the undercarriage would otherwise be subjected as a result of setting non-rotating wheels into rotation.

Thereafter, when the aircraft begins its braking after touching down, the rotation of the wheels is transmitted by the shafts 20, 10 to the motor units 11, 15 so their motors are driven and operate as generators. It is then possible either to recover the energy produced in this way and to store it in storage devices (batteries, capacitors, . . . ), or else to dissipate this energy, e.g. by means of a resistance, thereby creating resistance to rotation in the motors that contributes to braking the wheels, in addition to the action of the brake that is simultaneously braking the wheels.

Thereafter, when the aircraft has finished braking, it is possible to cause the aircraft to move by causing the motor units 11, 15 of both main undercarriages to run so as to rotate the associated wheels, as shown symbolically in FIG. 1. Naturally, the similar device fitted to the other main undercarriage is operated in the same manner in order to cause the wheels associated with the other undercarriage to rotate.

Controlling both devices identically thus contributes to rotating the wheels associated with each of the main undercarriages, thereby contributing to making the aircraft advance in a straight line. Differential control, causing the wheels of one of the undercarriages to rotate faster than the wheels of the other undercarriage, then contributes to assisting the aircraft in turning, in association with the steering control acting on the wheels of the nose undercarriage. The differential 21 serves to accommodate the difference in speeds of rotation between the wheels carried by a single undercarriage.

Those are the various functions that can be performed using the device of the invention in association with rotating the associated wheels. However, the device of the invention can also serve in moving the undercarriage between its deployed position and its stowed position, as a replacement for conventional raising actuators. Thus, it is possible to use the device of the invention to raise the undercarriage towards its stowed position. To do this, it is necessary for the side-brace stabilizing the undercarriage in its deployed position to be unlocked, and for its alignment to be folded so as to enable the undercarriage to be raised. It is then necessary to brake the wheels 3, using the brakes with which they are fitted. Preventing the wheels from rotating has the effect of preventing the second shaft 20 from rotating, and thus of preventing the first shaft 10 from rotating relative to the undercarriage. If the motor units 11, 15 are then used to attempt to rotate the first shaft 10 (in the appropriate direction), then torque is generated on the undercarriage about the hinge axis X, thereby tending to cause the undercarriage to rise towards its stowed position. It is then possible to cause the undercarriage to rise up to its stowed position in which the undercarriage is conventionally retained by a hook that prevents the undercarriage from moving away from its stowed position. In a variant, it is possible to block the undercarriage in position by blocking rotation of the first shaft 10 relative to the structure of the aircraft, e.g. by using a member for keeping at least one of the motor units stationary. This possibility makes it possible to omit the hook for holding the undercarriage in the stowed position.

In order to lower the undercarriage, it suffices to release it, either by unhooking the hook, or else by releasing the first shaft 10 relative to the aircraft. The undercarriage is then free to deploy under the effect of gravity. The device of the invention can then be used either to slow down the descent of the undercarriage, or else to contribute actively to lowering it, e.g. in order to confirm the undercarriage in its deployed position so as to guarantee that the side-brace locks automatically. In both situations, the wheels are braked, which has the effect of preventing the second shaft 20 from rotating, and thus of preventing the first shaft 10 from rotating relative to the undercarriage. The natural descent of the undercarriage under the effect of gravity thus causes the first shaft 10 to rotate relative to the structure of the aircraft, and thus drives the motors of the motor units in rotation. It then suffices to control the rotation of the motors so as to slow down and thus control the descent of the undercarriage so as to prevent it from reaching the deployed position at a speed that is too fast. The rotation of the motors may be controlled simply by causing them to deliver electricity to a resistance, or by using any other device suitable for creating an electromagnetic torque tending to oppose the forced rotation of the motor under the effect of the first shaft 10 rotating, thereby having the effect of slowing down the descent of the undercarriage. On the contrary, at the end of the stroke, power is delivered to the motors of the motor units 11, 15 so as to exert a moment on the first shaft 10 that tends in contrast to confirm the undercarriage moving into its deployed position.

Thus, with a single device, it becomes possible to perform several functions, such as operating undercarriages, recovering energy from braking, and moving the aircraft without assistance from its jets. The motors of the device are thus advantageously used during stages of landing, of the aircraft taxiing on the ground, and of takeoff.

According to a particular aspect of the invention, and in application to a multifunction device of the invention installed on a main undercarriage, the first shaft of the device may be driven not by one or more dedicated motor units, but rather by one or more common motor units that are arranged not far from the undercarriage in order to actuate the multifunction device of the invention, and also to actuate some other elements such as wing flaps 40. Thus, one or more motor units are used in common to actuate two elements (both the multifunction device of the invention and the wing flaps) that are to be actuated in sequence and that are thus never actuated simultaneously.

According to another particular aspect of the invention, the drive shafts 22 may be provided with couplers 27 for selectively coupling or uncoupling said drive shafts relative to the wheels 3. Thus, when the couplers are uncoupled, it is guaranteed that untimely powering of the motors 11, 15 does not lead to the wheels being rotated and does not cause a reaction torque to be applied to the undercarriage, in the event that the brakes are on.

Figure 4:
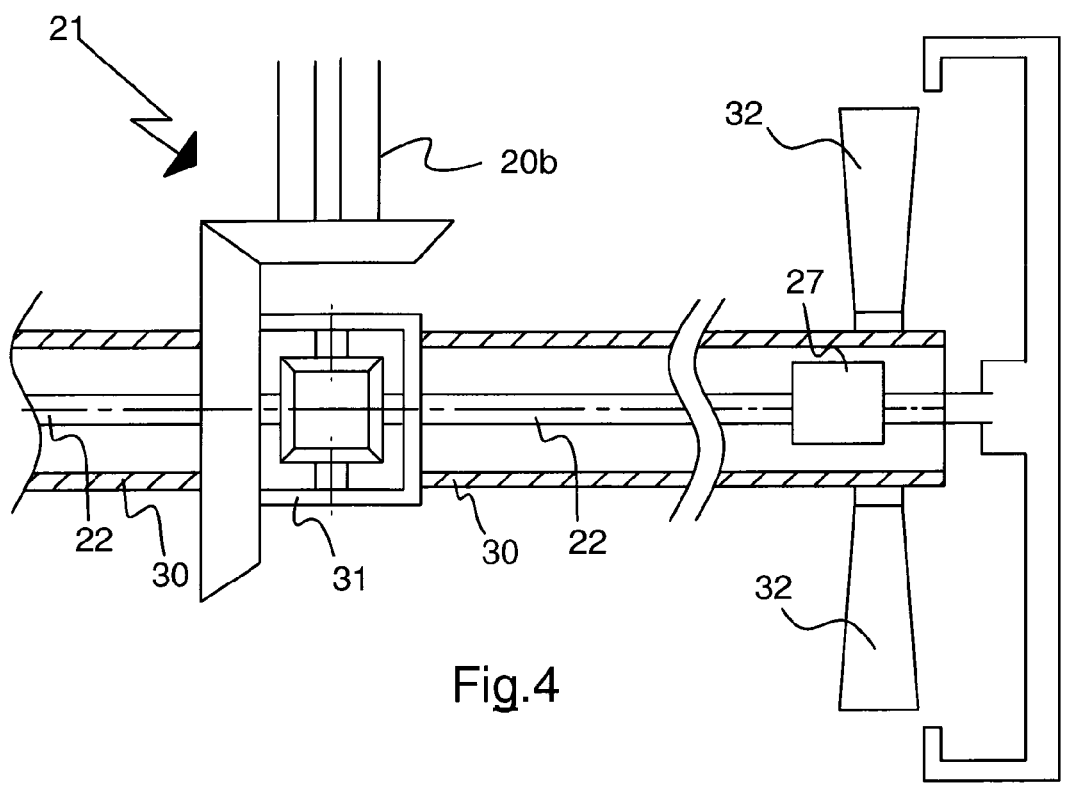
FIG. 4 is a fragmentary section view of the bottom of the device of the invention adapted to driving brake-cooling fans.

According to yet another particular aspect of the invention, and as shown in FIG. 4, it is also possible to use the device of the invention to drive fan blades 32 for cooling brake disks. This drive passes via hollow shafts 30 that extend around the drive shaft 22 and that are secured to the cage 31 of the differential 21. Under such circumstances, the drive shafts 22 are uncoupled from the wheels 3, so that rotation of the motor unit(s) 11, 15 does not drive the wheels 3 in rotation, but drives only the fan blades 32 in rotation.

Finally, it is possible to take advantage of the second shaft 20 passing through the undercarriage to cause the outside diameter of its top portion 20*a* to co-operate with a diaphragm carried by the slidable rod 2 in order to define a section for passing the fluid contained in the undercarriage so as to provide throttling that generates a force opposing compression of the undercarriage, in particular during landing. The outside diameter of the top portion 20*a* could be caused to vary in order to define flow sections that vary as a function of the extent to which the undercarriage is compressed.

The invention claimed is:

1. A multifunction device for an undercarriage, the multifunction device comprising at least:
    a first shaft rotatably mounted on an aircraft to rotate about an axis of rotation that is substantially parallel to a hinge axis hinging the undercarriage to the aircraft;
    a telescopic second shaft rotatably mounted on the undercarriage and extending along a member of the undercarriage;
    first transmission equipment for transmitting rotary motion from the first shaft to the telescopic second shaft;
    second transmission equipment for transmitting rotary motion from the telescopic second shaft to at least one wheel of a plurality of wheels carried by the undercarriage;
    a brake for selectively braking said at least one wheel; and
    a motor adapted to cause the first shaft to rotate;
    the multifunction device being characterized in that the telescopic second shaft is a single shaft and it extends inside the member of the undercarriage in direction of an axle carrying said wheels of the undercarriage, the second transmission equipment including a differential connected to the wheels carried by the axle via drive shafts extending inside the axle.

2. The multifunction device for an undercarriage according to claim 1, wherein each wheel carried by the axle and connected to the differential is connected to the differential via a coupler for selectively coupling or uncoupling said wheel to the differential.

3. The multifunction device according to claim 2, wherein hollow shafts extend around the drive shafts of the wheels and are secured to a cage of the differential carrying fan blades.

4. The multifunction device according to claim 1, wherein the motor is adapted to actuate sequentially either the multifunction device, or else wing flaps arranged close to the undercarriage carrying the multifunction device.

5. A method of raising an aircraft undercarriage between a deployed position and a stowed position relative to a structure of the aircraft, the method comprising the steps of:
    providing the multifunction device according to claim 1;
    unlocking a side-brace member of the undercarriage;
    preventing the first shaft and the telescopic second shaft of the multifunction device from rotating relative to the undercarriage, by actuating the said brake for selectively braking said at least one wheel; and
    controlling the motor to cause the first shaft to turn relative to the structure of the aircraft.

6. A method of lowering an aircraft undercarriage fitted with the multifunction device according to claim 1, between a stowed position and a deployed position, the method comprising the steps of:
    releasing the undercarriage to allow it to descend;
    preventing the shafts of the multifunction device from rotating relative to the undercarriage, by actuating said brake for selectively braking said at least one wheel; and
    controlling the forced rotation of the motor introduced by the undercarriage descending so as to regulate the descent of the undercarriage.

7. A method of setting into rotation the wheels of an aircraft undercarriage fitted with the multifunction device according to claim 1, the method comprising the steps of:
    ensuring that the undercarriage is in its deployed position;
    controlling the motor to cause the first shaft to rotate, so as to cause the second shaft to rotate, with this rotary motion being transmitted to the wheels via the differential.

8. A method of cooling brake disks fitted to wheels carried by an aircraft undercarriage fitted with the multifunction device according to claim 3, the method comprising the steps of:
    controlling the couplers to uncouple the drive shafts from the wheels; and
    controlling the motor to cause the hollow shafts carrying the fan blades to rotate.

9. A method of setting into rotation the wheels of an aircraft undercarriage fitted with the multifunction device according to claim 2, the method comprising the steps of:
ensuring that the undercarriage is in its deployed position;
controlling the motor to cause the first shaft to rotate, so as to cause the second shaft to rotate, with this rotary motion being transmitted to the wheels via the differential.

* * * * *